(12) United States Patent
Lin

(10) Patent No.: US 7,828,013 B2
(45) Date of Patent: Nov. 9, 2010

(54) WATER INLET DEVICE FOR MOUNTING A VALVE BODY ON A DECK

(76) Inventor: Ming-Shuan Lin, No. 29-2, Sec. 1, Tafeng Rd., Tantzu Hsiang, Taichung Hsien (TW)

( * ) Notice: Subject to any disclaimer, the term of this patent is extended or adjusted under 35 U.S.C. 154(b) by 747 days.

(21) Appl. No.: 11/805,440

(22) Filed: May 23, 2007

(65) Prior Publication Data
US 2008/0289701 A1 Nov. 27, 2008

(51) Int. Cl.
*F16K 11/20* (2006.01)
*E03C 1/042* (2006.01)

(52) U.S. Cl. .............................. 137/801; 4/695; 285/64
(58) Field of Classification Search ................. 137/801; 4/677, 678, 695; 285/8, 64
See application file for complete search history.

(56) References Cited

U.S. PATENT DOCUMENTS

| | | | | |
|---|---|---|---|---|
| 5,224,509 A | * | 7/1993 | Tanaka et al. ................ | 137/801 |
| 5,558,128 A | * | 9/1996 | Pawelzik et al. ............ | 137/801 |
| 6,006,784 A | * | 12/1999 | Tsutsui et al. ............... | 137/801 |
| 6,073,972 A | * | 6/2000 | Rivera ......................... | 137/801 |
| 6,286,808 B1 | * | 9/2001 | Slothower et al. ........... | 137/801 |
| 6,328,059 B1 | * | 12/2001 | Testori et al. .......... | 137/315.12 |
| 6,807,692 B2 | * | 10/2004 | Tsutsui et al. ............... | 137/801 |
| 6,912,742 B1 | * | 7/2005 | Wang ............................ | 4/695 |
| 7,032,260 B2 | * | 4/2006 | Hwang ......................... | 4/695 |
| 2005/0077725 A1 | | 4/2005 | Bartholoma et al. ..... | 285/143.1 |

* cited by examiner

*Primary Examiner*—John Fox
(74) *Attorney, Agent, or Firm*—Ladas & Parry, LLP

(57) ABSTRACT

A water inlet device is adapted for mounting a valve body that is formed with a water inlet hole on top of a deck, is adapted to be connected to a water inlet pipe, and includes a fixing unit and a connecting unit. The fixing unit is adapted to be secured to the deck, and is formed with a water supply hole corresponding in position to the water inlet hole in the valve body and adapted for connection to the water inlet pipe. The connecting unit is adapted to couple the valve body to the fixing unit, and includes a connecting component adapted to be secured to the valve body and formed with a guide hole to fluidly communicate the water inlet hole in the valve body and the water supply hole in the fixing unit, and a positioning unit for connecting separably the connecting component to the fixing unit.

6 Claims, 6 Drawing Sheets

WATER INLET DEVICE FOR MOUNTING A VALVE BODY ON A DECK

BACKGROUND OF THE INVENTION

1. Field of the Invention

The invention relates to a tapware, more particularly to a water inlet device for mounting a valve body on a deck.

2. Description of the Related Art

As shown in FIG. 1, a faucet 2 is to be mounted to a deck 1 and includes a valve body 3 that is connected to a water inlet pipe 4. The valve body 3 is formed with a water inlet hole 301 and a screw hole 302. The faucet 2 further includes a threaded securing component 303 and a nut 304. The threaded securing component 303 has one end that engages threadedly the screw hole 302, and an opposite end extending through the deck 1 and engaging the nut 304 so as to secure the faucet 2 to the deck 1. The water inlet pipe 4 has one end fixed in the water inlet hole 301, and an opposite end connected to a control valve 5.

When the faucet 2 is broken and needs to be replaced, a repairman has to close the control valve 5, disconnect the water inlet pipe 4 from the water inlet hole 301 in the valve body 3, loosen the nut 304, and then disconnect the threaded securing component 303 from the screw hole 302. The faucet dismounting operation is performed in a reversed order when installing a new faucet 2 on the deck 1. Therefore, the replacement process is relatively complicated. Moreover, during the process of replacing or installing the faucet 2, the repairman has to operate under the deck 1, which is inconvenient and incurs high labor costs.

SUMMARY OF THE INVENTION

Therefore, the object of the present invention is to provide a water inlet device for mounting a valve body on a deck, which facilities installation and replacement to result in lower labor costs.

Accordingly, a water inlet device of the present invention is adapted for mounting a valve body that is formed with a water inlet hole on top of a deck that has a top surface, and is adapted to be connected to a water inlet pipe. The water inlet device comprises a fixing unit and a connecting unit. The fixing unit is adapted to be secured to the top surface of the deck, and is formed with a water supply hole corresponding in position to the water inlet hole in the valve body and adapted for connection to the water inlet pipe. The connecting unit is adapted to couple the valve body to the fixing unit, and includes a connecting component that is adapted to be secured to the valve body and that is formed with a guide hole to fluidly communicate the water inlet hole in the valve body and the water supply hole in the fixing unit, and a positioning unit that connects separably the connecting component to the fixing unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
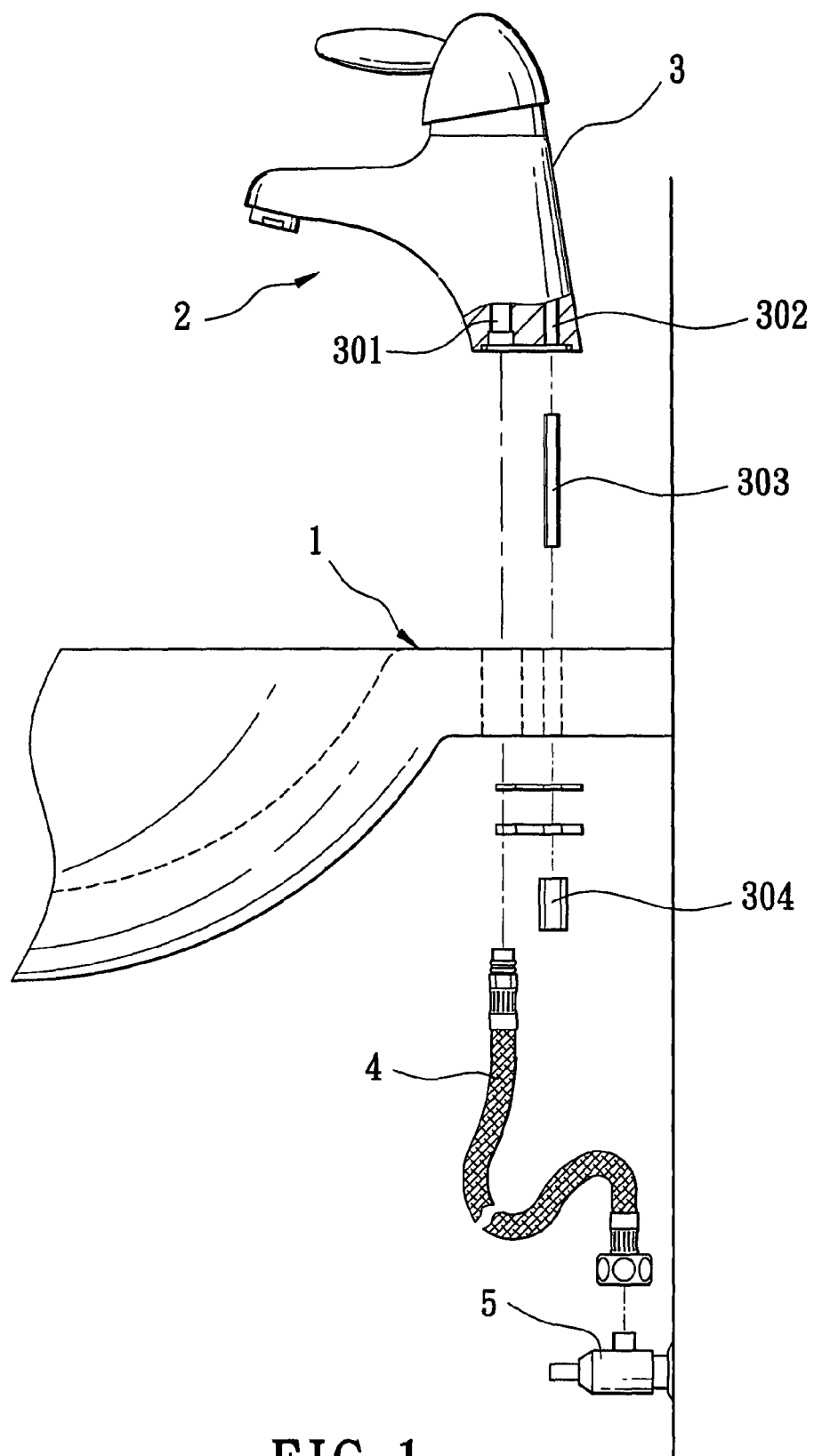
FIG. 1 is an exploded schematic view to illustrate how a faucet is mounted on a deck in the prior art.
Figure 2:
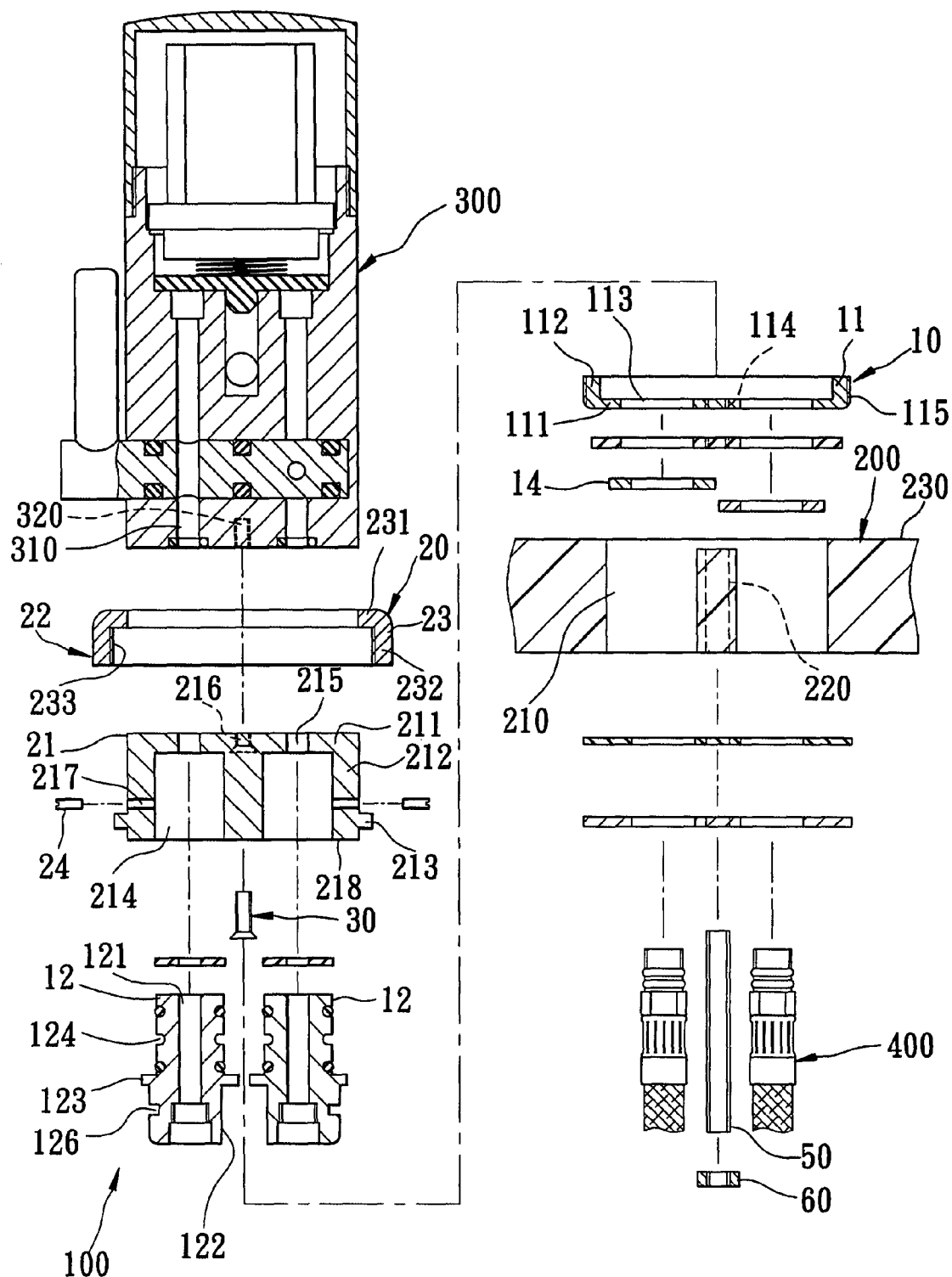
FIG. 2 is an exploded sectional view of a preferred embodiment of a water inlet device according to the invention.
Figure 3:
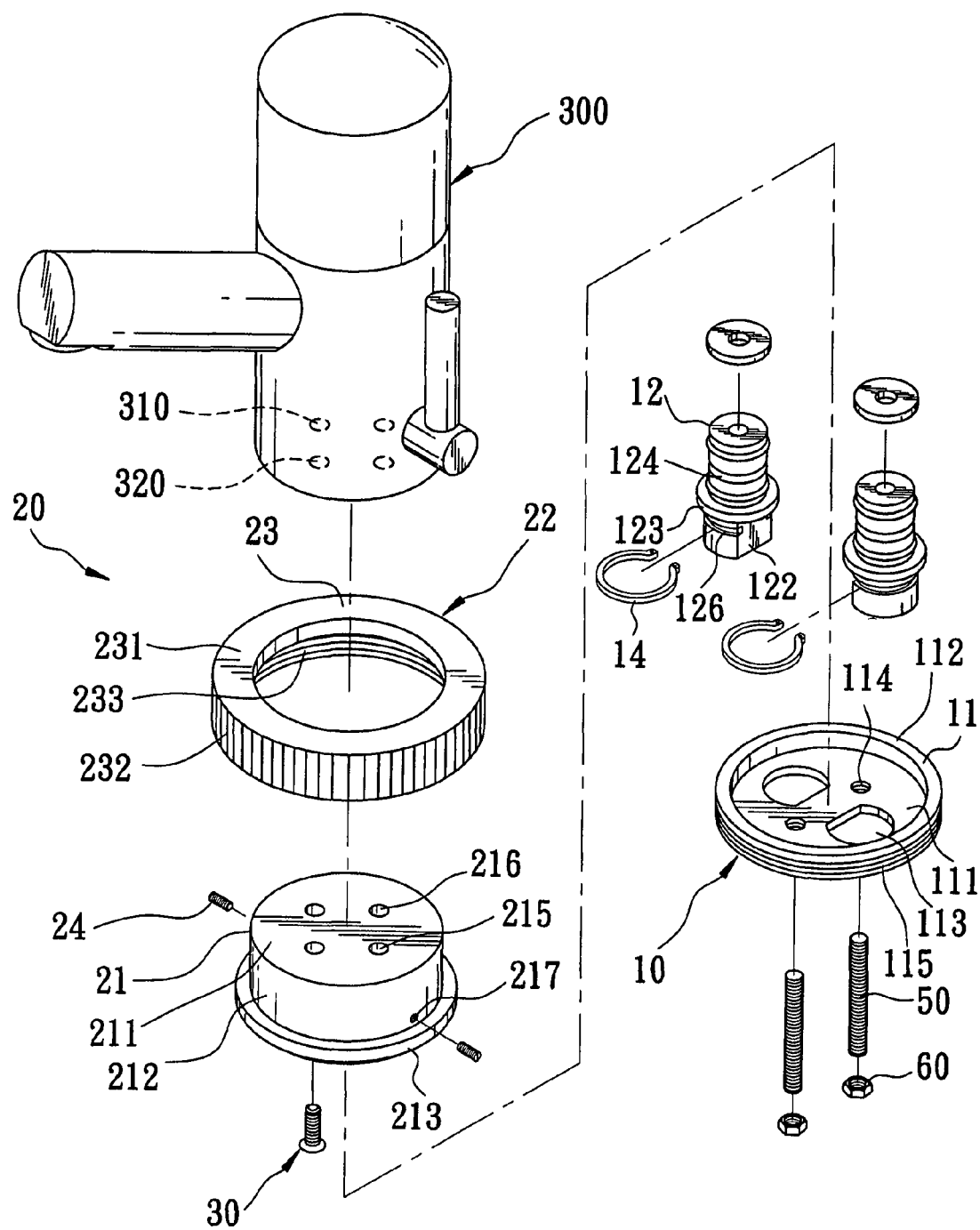
FIG. 3 is an exploded perspective view of the preferred embodiment.
Figure 5:
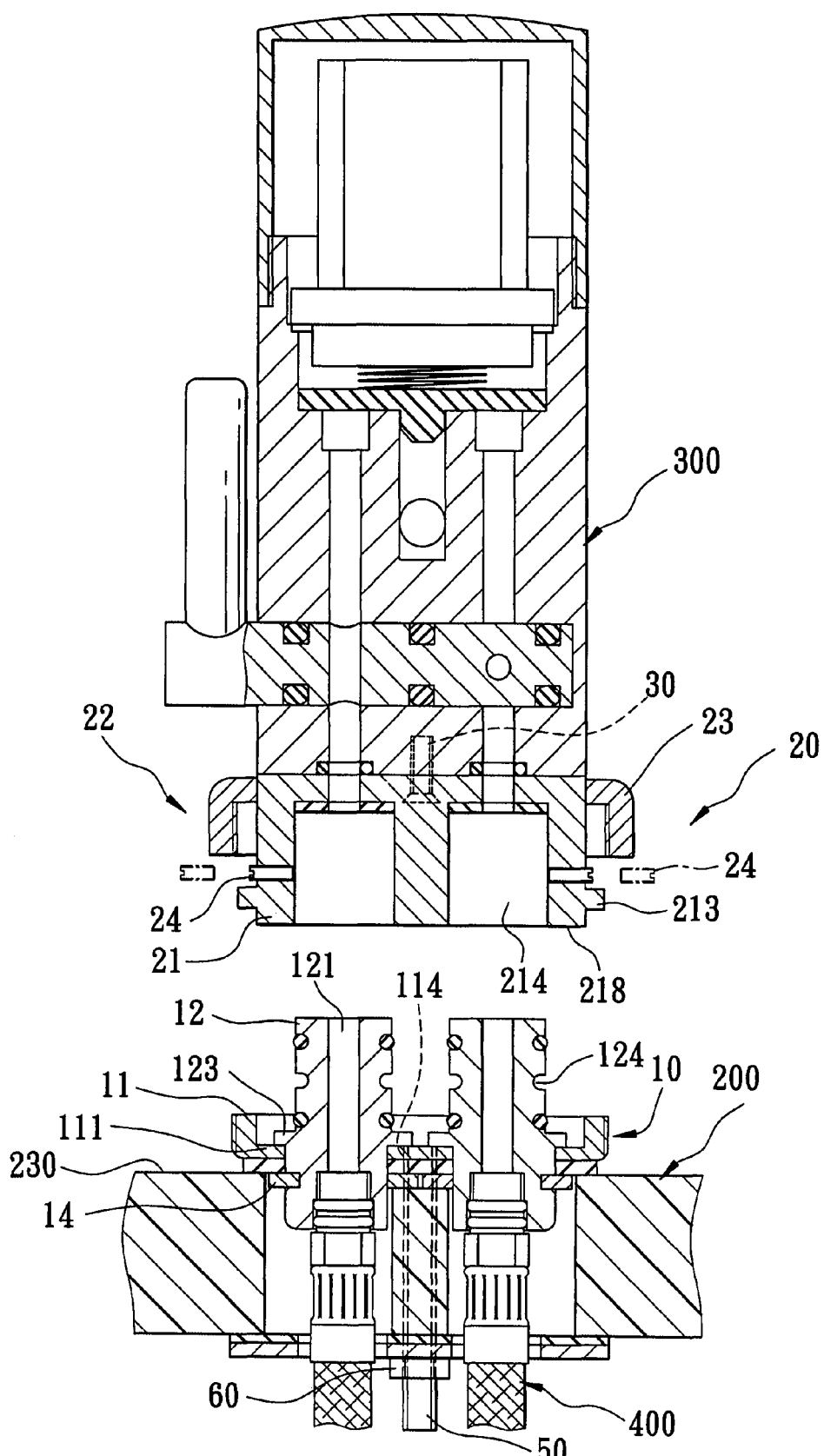
FIG. 5 is a partly exploded sectional view of the preferred embodiment, illustrating a connecting unit separated from a fixing unit.

As shown in FIGS. 2, 3, and 5, the preferred embodiment of a water inlet device 100 according to the present invention is adapted for mounting a valve body 300 on top of a deck 200 that has a top surface 230, and is adapted to be connected to a pair of water inlet pipes 400. The deck 200 has a pair of pipe holes 210 and a pair of through holes 220 (only one is shown). The valve body 300 is formed with a pair of water inlet holes 310 that correspond in position to the pipe holes 210 in the deck 200, and a pair of screw holes 320. The water inlet pipes 400 are connected to a control valve (not shown) in a conventional manner. The water inlet device 100 comprises a fixing unit 10 that is adapted to be secured to the top surface 230 of the deck 200, a connecting unit 20 that is adapted to couple the valve body 300 to the fixing unit 10, a pair of screws 30 (only one is shown), a pair of threaded securing components 50, and a pair of nuts 60.

The fixing unit 10 includes a fixing plate component 11 adapted to be secured to the top surface 230 of the deck 200, and a pair of water guide tubes 12 secured to the fixing plate component 11. The fixing plate component 11 has a base plate 111, and a surrounding wall 112 that extends upwardly from a periphery of the base plate 111. In this embodiment, the base plate 111 is formed with a pair of D-shaped noncircular holes 113 corresponding in position to the pipe holes 210 in the deck 200, and a pair of threaded holes 114. The surrounding wall 112 is formed with an external thread 115. Each of the water guide tubes 12 is formed with a water supply hole 121 that corresponds in position to a respective one of the water inlet holes 310 and that is adapted for connection to a respective one of the water inlet pipes 400, and has an insert portion 122, a positioning flange 123 disposed above the insert portion 122, a retaining portion 124 disposed above the positioning flange 123, and a retaining groove 126 formed in the insert portion 122. The positioning flange 123 abuts against the base plate 111 of the fixing plate component 11 when the insert portion 122 is inserted fittingly and downwardly through a respective one of the insert holes 113 in the base plate 11. The fixing unit 10 further includes a pair of snap rings 14 disposed under the fixing plate component 11, each of which engages the retaining groove 126 in the insert portion 122 of a respective one of the water guide tubes 12 to secure the latter to the fixing plate component 11.

The threaded securing components 50 are adapted to extend respectively through the through holes 220 in the deck 200, and engage threadedly and respectively the threaded holes 114 in the fixing plate component 11 of the fixing unit 10. The nuts 60 engage respectively the threaded securing components 50 and cooperate with the fixing plate component 11 so as to be adapted to clamp the deck 200 therebetween.

Figure 4:
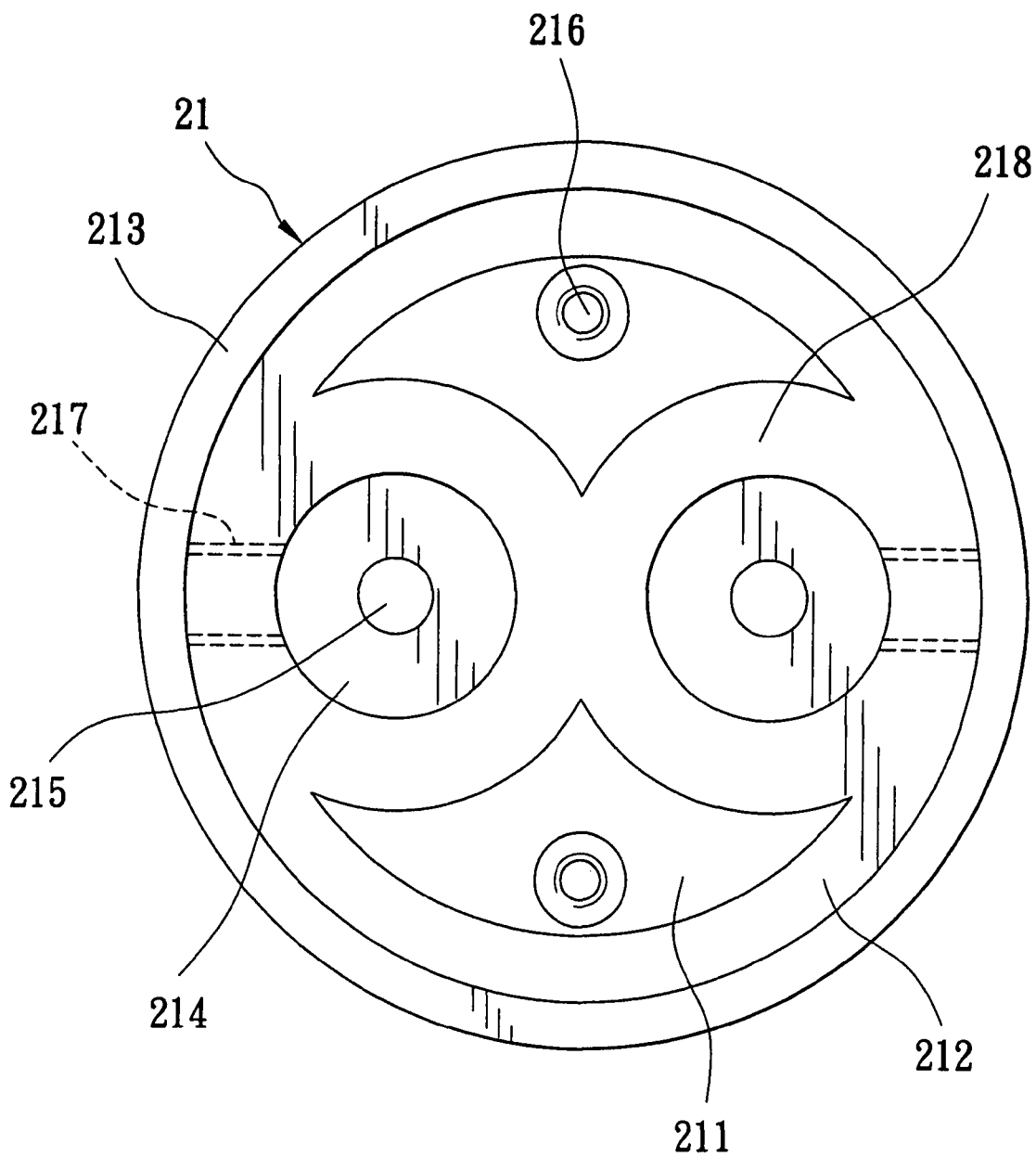
FIG. 4 is a bottom view of a connecting component of the preferred embodiment.

The connecting unit 20 includes a connecting component 21 adapted to be secured to the valve body 300 through the screws 30, and a positioning unit 22 for connecting separably the connecting component 21 to the fixing unit 10. As further shown in FIG. 4, the connecting component 21 of the connecting unit 20 includes a top wall 211, a bottom wall 218, and a side wall 212 interconnecting the top and bottom walls 211, 218. The top wall 211 is formed with a pair of guide holes 215, each of which is adapted to fluidly communicate one of the water inlet holes 310 in the valve body 300 and the water supply hole 121 in one of the water guide tubes 12 of the fixing unit 10, and a pair of locking holes 216 that are adapted to correspond in position to the screw holes 320 in the valve body 300, and through which the screws 30 extend, respectively. The bottom wall 218 is formed with a pair of receiving holes 214 to engage fittingly and respectively with the water guide tubes 12. The side wall 212 is formed with a stop flange 213 that protrudes outwardly relative to the receiving holes 214, and a pair of positioning screw holes 217, each of which is to be registered with the retaining portion 124 of a respective one of the water guide tubes 12. The positioning unit 22 of the connecting unit 20 includes a positioning ring component 23 and a pair of positioning screws 24. The positioning ring component 23 has an annular surrounding portion 232 that is disposed to engage separably the fixing plate component 11 of the fixing unit 10, and an annular protruding portion 231 that protrudes inwardly from the annular surrounding portion 232 and that is disposed to abut against the stop flange 213 of the connecting component 21 of the connecting unit 20. The annular surrounding portion 232 is formed with an internal thread 233 to engage the external thread 115 formed in the fixing plate component 11 of the fixing unit 10 for coupling the connecting component 21 to the fixing plate component 11. The positioning screws 24 extend threadedly and respectively through the positioning screw holes 217 in the side wall 212, and are retained respectively in the retaining portions 124 of the water guide tubes 12 for coupling the connecting component 21 to the water guide tubes 12. Therefore, the connecting component 21 can be positioned effectively relative to the fixing unit 10 by virtue of the positioning ring component 23 and the positioning screws 24.

Figure 6:
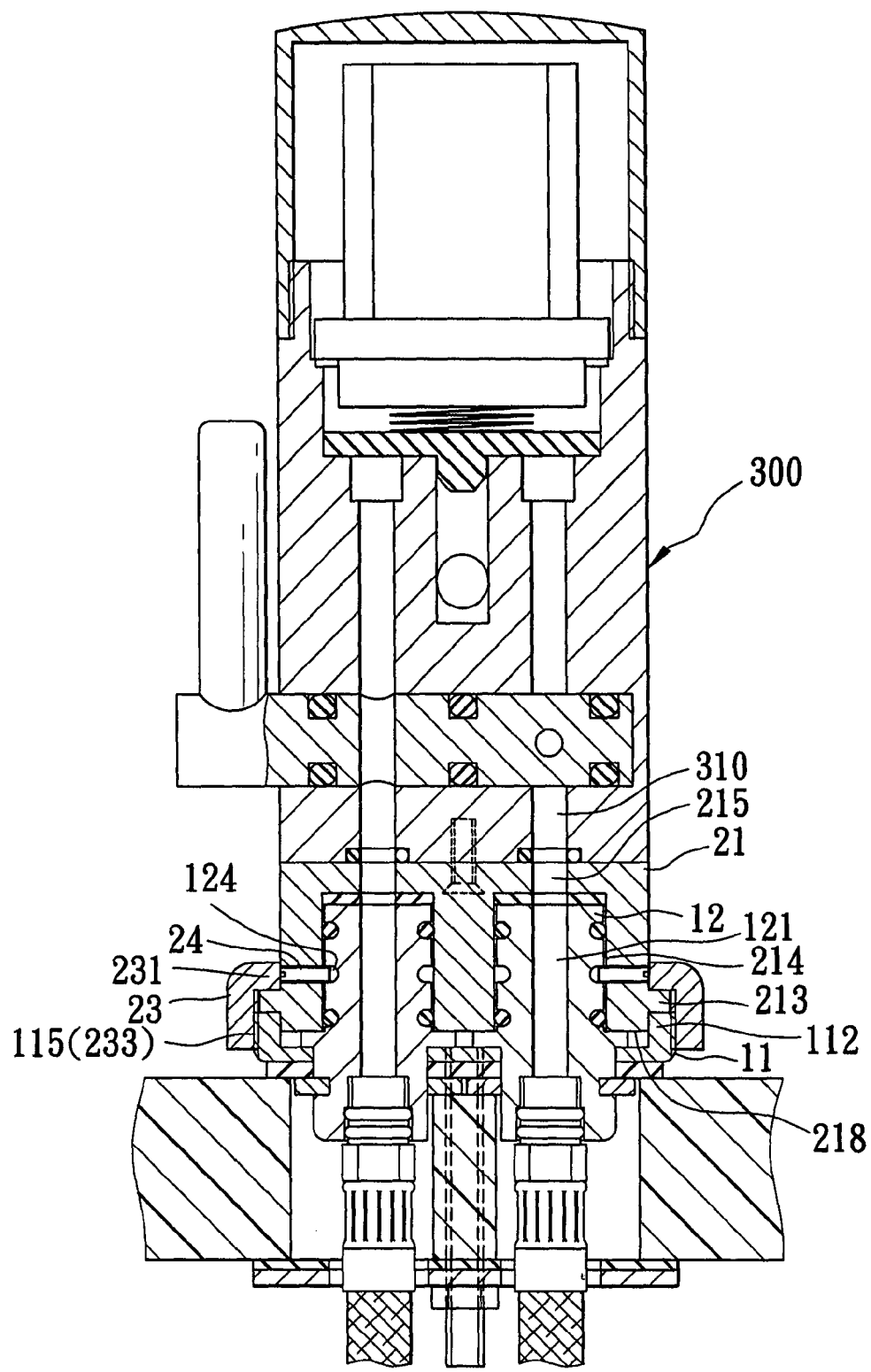
FIG. 6 is an assembled sectional view of the preferred embodiment.

As shown in FIGS. 5 and 6, installation of the water inlet device 100 of the present invention involves a two-part process. First, the repairman mounts the fixing unit 10 on top of the deck 200, and connects respectively the water inlet pipes 400 to the water supply holes 121 in the water guide tubes 12 of the fixing unit 10. The second part of the process is to couple the connecting unit 20 to the valve body 300. The repairman sleeves the positioning ring component 23 of the positioning unit 22 of the connecting unit 20 on the connecting component 21 such that the positioning ring component 23 abuts against the stop flange 213 of the connecting component 21 of the connecting unit 20, and secures the top wall 211 of the connecting component 21 to the valve body 300 through the screws 30. This part of the process will be repeated whenever the valve body 300 is to be replaced.

As shown in FIG. 6, to complete installation of the water inlet device 100 of the present invention, the repairman first engages respectively the water guide tubes 12 into the receiving holes 214 in the bottom wall 218 of the connecting component 21. Then, the repairman secures the connecting component 21 to the water guide tubes 12 by driving respectively the positioning screws 24 so as to be retained respectively in the retaining portions 124 of the water guide tubes 12. Finally, the repairman engages the positioning ring component 23 to the fixing plate component 11 until the annular protruding portion 231 of the positioning ring component 23 abuts against the stop flange 213. At this time, the positioning ring component 23 is secured to the fixing plate component 11, and the water inlet holes 310 in the valve body 300 are fluidly and respectively communicated with the guide holes 215 in the top wall 211 of the connecting component 21, the water supply holes 121 in the water guide tubes 12, and the water inlet pipes 400.

To replace the valve body 300, the repairman only needs to loosen the positioning ring component 23 and separate it from the fixing plate component 11 of the fixing unit 10, drive the positioning screws 24 out of the retaining portions 124 of the water guide tubes 12 of the fixing unit 10, and finally pull the valve body 300 together with the connecting unit 20 away from the fixing unit 10. Therefore, the process of installing and replacing is made simple by the water inlet device 100 of the present invention. Moreover, once the fixing unit 10 is secured to the deck 200, the repairman no longer has to work under the deck 200 to install or replace the valve body 300, thereby resulting in convenience and lower labor costs.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A water inlet device adapted for mounting a valve body on top of a deck, the valve body being formed with a water inlet hole, the deck having a top surface, said water inlet device being adapted to be connected to a water inlet pipe, said water inlet device comprising:

a fixing unit that is adapted to be secured to the top surface of the deck, and that is formed with a water supply hole corresponding in position to the water inlet hole in the valve body and adapted for connection to the water inlet pipe; and a connecting unit that is adapted to couple the valve body to said fixing unit, and that includes a connecting component adapted to be secured to the valve body and formed with a guide hole to fluidly communicate the water inlet hole in the valve body and said water supply hole in said fixing unit, and a positioning unit for connecting separably said connecting component to said fixing unit;

wherein said fixing unit includes a fixing plate component adapted to be secured to the top surface of the deck, and a water guide tube secured to said fixing plate component and formed with said water supply hole; and wherein said fixing plate component of said fixing unit has a noncircular insert hole, said water guide tube of said fixing unit having an insert portion and a positioning flange that is disposed above said insert portion so as to abut against said fixing plate component when said insert portion is inserted fittingly and downwardly through said insert hole in said fixing plate component, said fixing unit further including a snap ring disposed under said fixing plate component to engage said insert portion of said water guide tube and secure said water guide tube to said fixing plate component.

2. The water inlet device as claimed in claim 1, further comprising a threaded securing component adapted to extend through the deck and engaging threadedly said fixing plate component of said fixing unit, and a nut engaging said threaded securing component and cooperating with said fixing plate component so as to be adapted to clamp the deck therebetween.

3. A water inlet device adapted for mounting a valve body on top of a deck, the valve body being formed with a water inlet hole, the deck having a top surface, said water inlet device being adapted to be connected to a water inlet pipe, said water inlet device comprising:

a fixing unit that is adapted to be secured to the top surface of the deck, and that is formed with a water supply hole corresponding in position to the water inlet hole in the valve body and adapted for connection to the water inlet pipe; and a connecting unit that is adapted to couple the valve body to said fixing unit, and that includes a connecting component adapted to be secured to the valve body and formed with a guide hole to fluidly communicate the water inlet hole in the valve body and said water supply hole in said fixing unit, and a positioning unit for connecting separably said connecting component to said fixing unit;

wherein said fixing unit includes a fixing plate component adapted to be secured to the top surface of the deck, and a water guide tube secured to said fixing plate component and formed with said water supply hole; and wherein said connecting component of said connecting unit includes a top wall, a bottom wall, and a side wall interconnecting said top and bottom walls, said top wall being formed with said guide hole, said bottom wall being formed with a receiving hole to engage fittingly said water guide tube of said fixing unit, said side wall being formed with a stop flange that protrudes outwardly relative to said receiving hole.

4. The water inlet device as claimed in claim 3, wherein:
said positioning unit of said connecting unit includes a positioning ring component having an annular surrounding portion that is disposed to engage separably said fixing plate component of said fixing unit, and an annular protruding portion that protrudes inwardly from said annular surrounding portion and that is disposed to abut against said stop flange of said connecting component of said connecting unit; and said annular surrounding portion is formed with an internal thread, and said fixing plate component of said fixing unit is formed with an external thread to engage said internal thread.

5. The water inlet device as claimed in claim 3, wherein:
said side wall of said connecting component of said connecting unit is formed with a positioning screw hole;
said water guide tube of said fixing unit further has a retaining portion to be registered with said positioning screw hole; and
said positioning unit of said connecting unit includes a positioning screw that extends threadedly through said positioning screw hole in said side wall, and that is retained in said retaining portion of said water guide tube.

6. The water inlet device as claimed in claim 3, further comprising a threaded securing component adapted to extend through the deck and engaging threadedly said fixing plate component of said fixing unit, and a nut engaging said threaded securing component and cooperating with said fixing plate component so as to be adapted to clamp the deck therebetween.

* * * * *